United States Patent
Paquet et al.

(10) Patent No.: US 8,936,324 B2
(45) Date of Patent: Jan. 20, 2015

(54) CROSS-LINKS FOR A TRACK OF A TRACKED VEHICLE

(75) Inventors: Francois Paquet, Granby (CA); Amine Khimjee, St-Paul-d'Abbotsford (CA); Patrick Bernard, St-Cesaire (CA)

(73) Assignee: Snowgrolic S.A R.L., Luxembourg (LU)

( * ) Notice: Subject to any disclaimer, the term of this patent is extended or adjusted under 35 U.S.C. 154(b) by 866 days.

(21) Appl. No.: 12/738,112

(22) PCT Filed: Oct. 15, 2008

(86) PCT No.: PCT/CA2008/001832
§ 371 (c)(1),
(2), (4) Date: Jul. 12, 2010

(87) PCT Pub. No.: WO2009/049416
PCT Pub. Date: Apr. 23, 2009

(65) Prior Publication Data
US 2010/0276991 A1  Nov. 4, 2010

Related U.S. Application Data

(60) Provisional application No. 60/980,166, filed on Oct. 15, 2007.

(51) Int. Cl.
*B62D 55/26* (2006.01)
*B62D 55/24* (2006.01)
(Continued)

(52) U.S. Cl.
CPC .............. *B62D 55/24* (2013.01); *B62D 55/202* (2013.01); *B62D 55/26* (2013.01); *B62D 55/275* (2013.01); *B62D 55/286* (2013.01)
USPC ............ 305/181; 305/174; 305/187; 305/191

(58) Field of Classification Search
USPC ......... 305/157–158, 171, 173–174, 177, 181, 305/193, 187, 189–191
See application file for complete search history.

(56) References Cited

U.S. PATENT DOCUMENTS 1,296,512 A * 3/1919 Hatfield ..................... 305/159
1,608,517 A * 11/1926 Masury ..................... 305/117
(Continued)

FOREIGN PATENT DOCUMENTS

| CA | 956351 | 10/1974 |
| CA | 2430028 | 11/2004 |

(Continued)

OTHER PUBLICATIONS

PistenBully 100 AllSeason Product Brochure, Kassbohrer Gelandefahrzeug AG (Apr. 2008).
(Continued)

*Primary Examiner* — Jason Bellinger
(74) *Attorney, Agent, or Firm* — Woodard, Emhardt, Moriarty, McNett & Henry LLP (57) ABSTRACT

A cross-link for a track that comprises belts spaced apart to accommodate a plurality of wheels of a tracked vehicle on which the track is mounted, the belts having a ground-facing side. In one embodiment, the cross-link comprises an elongate member for mounting to the belts to interconnect the belts, the elongate member having a belt-engaging face contacting the belts on the ground-facing side when the elongate member is mounted to the belts. The elongate member defines a channel including a bottom portion and a pair of sidewalls opposite one another on either side of the bottom portion. The cross-link also comprises a sole mountable in the channel for engaging a ground surface on which the tracked vehicle travels, the sole comprising a pair of sidewall-engaging surfaces for engaging the sidewalls when the sole is mounted in the channel.

59 Claims, 10 Drawing Sheets

(51) Int. Cl.
   *B62D 55/20*  (2006.01)
   *B62D 55/275* (2006.01)
   *B62D 55/28*  (2006.01)

(56) References Cited

U.S. PATENT DOCUMENTS

| | | | |
|---|---|---|---|
| 1,773,534 A | | 8/1930 | Kegresse |
| 2,515,128 A | * | 7/1950 | Lammertse ............ 305/181 |
| 2,749,189 A | | 6/1956 | France at al. |
| 3,148,920 A | * | 9/1964 | Nodwell ............... 305/181 |
| 3,390,924 A | * | 7/1968 | Bumbaugh ............. 305/181 |
| 3,463,562 A | | 8/1969 | Svensson |
| 3,572,851 A | | 3/1971 | Schuler |
| 3,642,332 A | * | 2/1972 | Sinclair et al. ........ 305/162 |
| 3,703,321 A | | 11/1972 | Schoonover |
| 3,853,359 A | | 12/1974 | Pusch |
| 4,448,273 A | * | 5/1984 | Barbieri .............. 180/9.21 |
| 4,448,459 A | | 5/1984 | Kortering et al. |
| 4,795,222 A | * | 1/1989 | Smith ................. 305/181 |
| 4,844,562 A | | 7/1989 | Ranner |
| 5,368,376 A | | 11/1994 | Edwards et al. |
| 5,676,436 A | * | 10/1997 | Hart ................... 305/157 |
| 5,707,123 A | * | 1/1998 | Grob .................. 305/169 |
| 5,899,164 A | | 5/1999 | Coast |
| 6,520,603 B2 | | 2/2003 | Shimada et al. |
| 8,011,739 B2 | * | 9/2011 | Busley ................ 305/46 |
| 2011/0316330 A1 | * | 12/2011 | Doyle ................. 305/165 |

FOREIGN PATENT DOCUMENTS

| | | | |
|---|---|---|---|
| FR | 1421494 | 12/1965 | |
| JP | 53-23437 A | * 3/1978 | ............ 305/173 |
| JP | 5-16843 A | * 1/1993 | ............ 305/173 |

OTHER PUBLICATIONS

PistenBully 400 Steel Summer Track Product Brochure, Kassbohrer Gelandefahrzeug AG (Apr. 2009).
International Patent Application No. PCT/CA2010/000612 International Search Report mailed Jan. 13, 2011.
International Patent Application No. PCT/CA2010/000612 Written Opinion mailed Jan. 13, 2011.
International Patent Application No. PCT/CA2008/001832 International Search Report mailed Jan. 22, 2009.
International Patent Application No. PCT/CA2008/001832 Written Opinion mailed Jan. 22, 2009.
European Patent Application 08839275.8 Extended Search Report mailed Mar. 9, 2011.
FR 1,421,494 Machine Translation.

* cited by examiner

CROSS-LINKS FOR A TRACK OF A TRACKED VEHICLE

CROSS-REFERENCE TO RELATED APPLICATION

This application claims the benefit under 35 USC 119(e) of U.S. Provisional Patent Application No. 60/980,166 filed by F. Paquet et al. on Oct. 15, 2007 and hereby incorporated by reference herein.

FIELD OF THE INVENTION

The invention relates generally to tracks for tracked vehicles and, more particularly, to cross-links for such tracks.

BACKGROUND

Certain types of tracked vehicles, such as tractors and carriers used in various industrial or military applications, are propelled by a pair of tracks each comprising belts that are interconnected by a series of cross-links distributed longitudinally along the track.

Cross-links are typically made of metal, such as so-called "D-dent" cross-links and "flat track" cross-links which are forged into shape. These cross-links may be suitable when a tracked vehicle on which they are provided is on soft terrain (e.g., earth, mud). However, due to the tracked vehicle's weight, they are often unsuitable and/or unacceptable for use on hard surfaces (e.g., paved surfaces) as they tend to damage such hard surfaces.

Some flat track cross-links have been permanently embedded in a rubber envelope to reduce their impact on hard surfaces. However, in view of the rubber envelope's permanent presence, these cross-links often prove inadequate in situations or applications where enhanced traction of metallic cross-links is desired or required, such as on very soft terrain.

Other flat track cross-links have been provided with urethane shoes bolted thereon to reduce their impact on hard surfaces. However, urethane is relatively expensive, thus discouraging mass production of such shoes. Furthermore, stones and other small hard objects typically become easily trapped in bolt holes of the urethane shoes such that subsequent use of a tracked vehicle equipped with such cross-links on a hard surface can still inflict damage on that surface. Moreover, urethane has a relatively low friction coefficient which can lead to poor traction capability in some applications.

Accordingly, there is a need for improvements in cross-links for tracks of tracked vehicles.

SUMMARY OF THE INVENTION

According to a first broad aspect, the invention provides a cross-link for a track that comprises belts spaced apart to accommodate a plurality of wheels of a tracked vehicle on which the track is mounted, the belts having a ground-facing side. The cross-link comprises an elongate member for mounting to the belts to interconnect the belts, the elongate member having a belt-engaging face contacting the belts on the ground-facing side when the elongate member is mounted to the belts. The cross-link also comprises a wheel guide comprising a pair of projections spaced apart from one another, the projections extending from the belt-engaging face and opposite the ground-facing side. The wheel guide is capable of engaging the wheels of the tracked vehicle as the tracked vehicle travels over the track such that, when the wheel guide engages a given one of the wheels, the given one of the wheels is received between the projections.

According to a second broad aspect, the invention provides a cross-link for a track that comprises belts spaced apart to accommodate a plurality of wheels of a tracked vehicle on which the track is mounted, the belts having a ground-facing side. The cross-link comprises an elongate member for mounting to the belts to interconnect the belts, the elongate member having a belt-engaging face contacting the belts on the ground-facing side when the elongate member is mounted to the belts. The elongate member defines a channel including a bottom portion and a pair of sidewalls extending from the bottom portion, each of the sidewalls having a height, measured relative to the belt-engaging face, of at least 30 mm.

According to a third broad aspect, the invention provides a cross-link for a track that comprises belts spaced apart to accommodate a plurality of wheels of a tracked vehicle on which the track is mounted, the belts having a ground-facing side. The cross-link comprises an elongate member for mounting to the belts to interconnect the belts, the elongate member having a belt-engaging face contacting the belts on the ground-facing side when the elongate member is mounted to the belts. The elongate member defines a channel including a bottom portion and a pair of sidewalls extending from the bottom portion. Each of the sidewalls has a height and a thickness, the height being measured relative to the belt-engaging face. Each of the sidewalls has a height-to-thickness ratio of at least 3.0.

According to a fourth broad aspect, the invention provides a cross-link for a track that comprises belts spaced apart to accommodate a plurality of wheels of a tracked vehicle on which the track is mounted, the belts having a ground-facing side for facing a ground surface on which the tracked vehicle travels. The cross-link comprises an elongate member for mounting to the belts to interconnect the belts, the elongate member having a belt-engaging face contacting the belts on the ground-facing side when the elongate member is mounted to the belts. The elongate member defines a channel including a bottom portion and a pair of sidewalls extending from the bottom portion, each of the sidewalls having a terminating edge for engaging the ground surface to form a region of localized pressure on the ground surface.

According to a fifth broad aspect, the invention provides a sole for a cross-link of a track that comprises belts spaced apart to accommodate a plurality of wheels of a tracked vehicle on which the track is mounted. The cross-link comprises an elongate member having a first end and a second end, the elongate member defining a channel including a bottom portion and a pair of sidewalls opposite one another on either side of the bottom portion. The sole is mountable in the channel and comprises a pair of sidewall-engaging surfaces for engaging the sidewalls when the sole is mounted in the channel, the sidewall-engaging surfaces being generally parallel to one another.

According to a sixth broad aspect, the invention provides a sole for a cross-link of a track that comprises belts spaced apart to accommodate a plurality of wheels of a tracked vehicle on which the track is mounted. The cross-link comprises an elongate member for mounting to the belts to interconnect the belts, the elongate member defining a channel including a bottom portion and a pair of sidewalls opposite one another on either side of the bottom portion. The sole comprises a base portion for mounting in the channel of the elongate member and a ground-engaging portion comprising elastomeric material for engaging a ground surface on which the tracked vehicle moves.

According to a seventh broad aspect, the invention provides a sole for a cross-link of a track that comprises belts spaced apart to accommodate a plurality of wheels of a tracked vehicle on which the track is mounted. The cross-link comprises an elongate member for mounting to the belts to interconnect the belts. The sole comprises: an inner side for facing the elongate member to mount the sole to the elongate member; an outer side opposite the inner side for engaging a ground surface on which the tracked vehicle moves; and a plurality of blind holes extending from the inner side without reaching the outer side, the sole being mountable to the elongate member via a plurality of fasteners received in the blind holes.

According to an eighth broad aspect, the invention provides a cross-link for a track that comprises belts spaced apart to accommodate a plurality of wheels of a tracked vehicle on which the track is mounted, the belts having a ground-facing side. The cross-link comprises an elongate member for mounting to the belts to interconnect the belts, the elongate member having a belt-engaging face contacting the belts on the ground-facing side when the elongate member is mounted to the belts. The elongate member defines a channel including a bottom portion and a pair of sidewalls opposite one another on either side of the bottom portion. The cross-link also comprises a sole mountable in the channel for engaging a ground surface on which the tracked vehicle travels, the sole comprising a pair of sidewall-engaging surfaces for engaging the sidewalls when the sole is mounted in the channel.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1A:
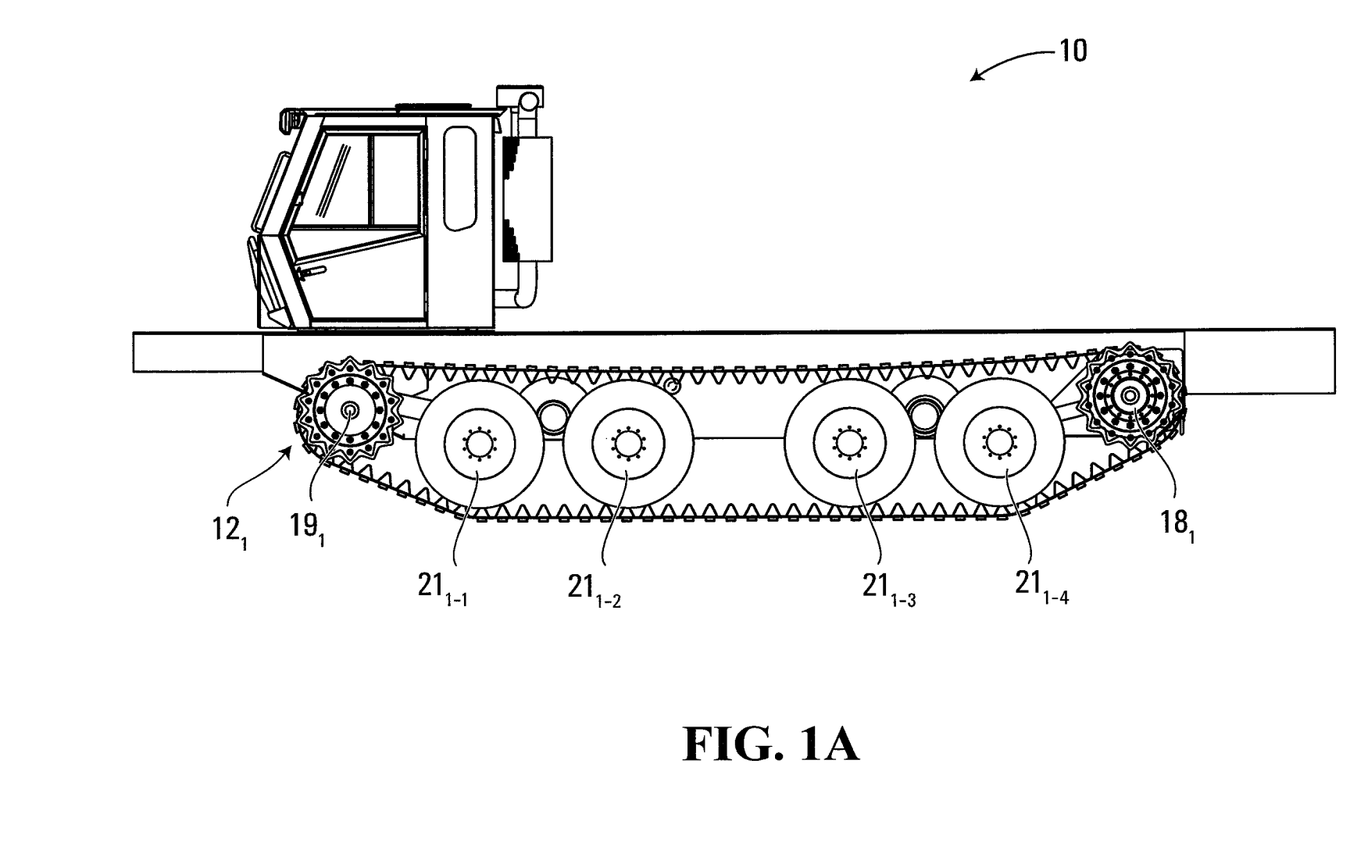
FIGS. 1A and 1B respectively show a side view and a front view of an example of a tracked vehicle comprising a pair of tracks each comprising a plurality of cross-links in accordance with an embodiment of the invention.
Figure 1B:
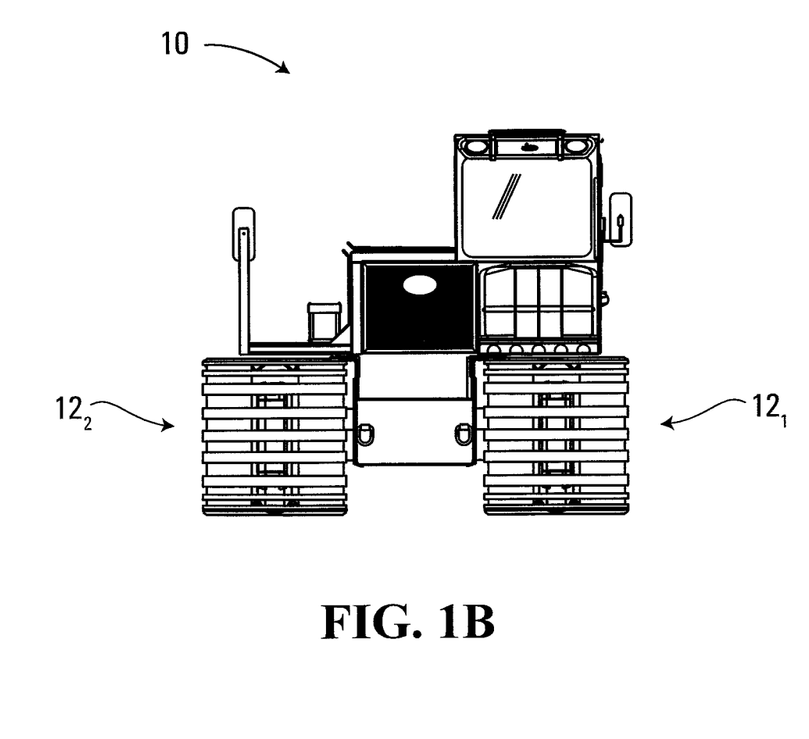

FIGS. 1A and 1B show a tracked vehicle 10 comprising a pair of tracks $12_1$, $12_2$ in accordance with an embodiment of the invention. The tracked vehicle 10 comprises a prime mover (e.g., an internal combustion engine) in a driving relationship with a pair of drive wheels $18_1$, $18_2$ (in this case, sprockets) each driving a respective one of the tracks $12_1$, $12_2$ to propel the tracked vehicle 10 on a ground surface. As it is driven by the respective one of the drive wheels $18_1$, $18_2$, each of the tracks $12_1$, $12_2$ moves in an endless path around that drive wheel as well as a respective one of a pair of idler wheels $19_1$, $19_2$ (in this case, sprockets) and a respective one of two sets of support wheels $21_{1-1}$-$21_{1-4}$, $21_{2-1}$-$21_{2-4}$ of the tracked vehicle 10. The tracked vehicle 10 can be used in various industrial, military and/or other applications over various types of terrain.

Figure 2:
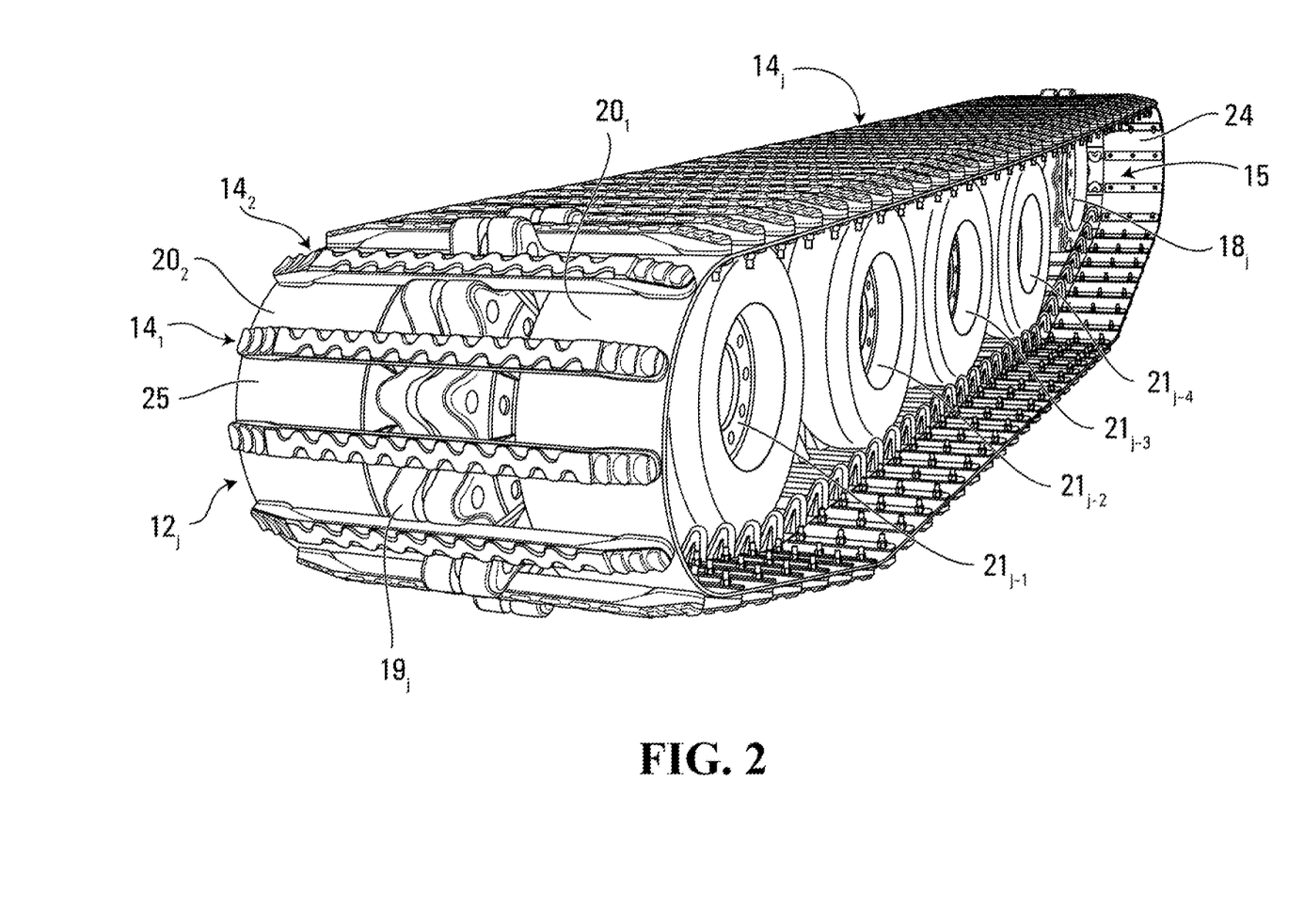
FIG. 2 shows one of the tracks arranged in an endless path around a plurality of wheels of the tracked vehicle.
Figure 3:
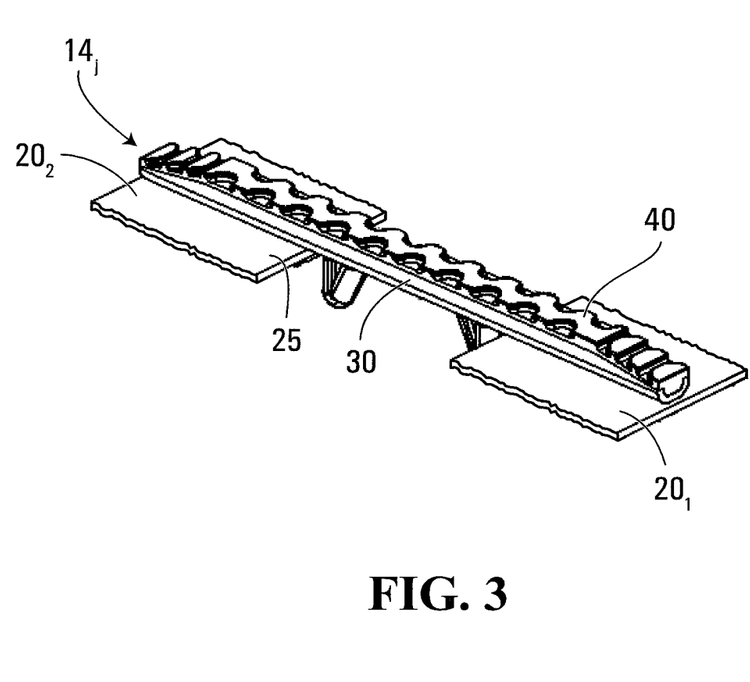
FIGS. 3 and 4 show different perspective views of one of the cross-links.
Figure 4:
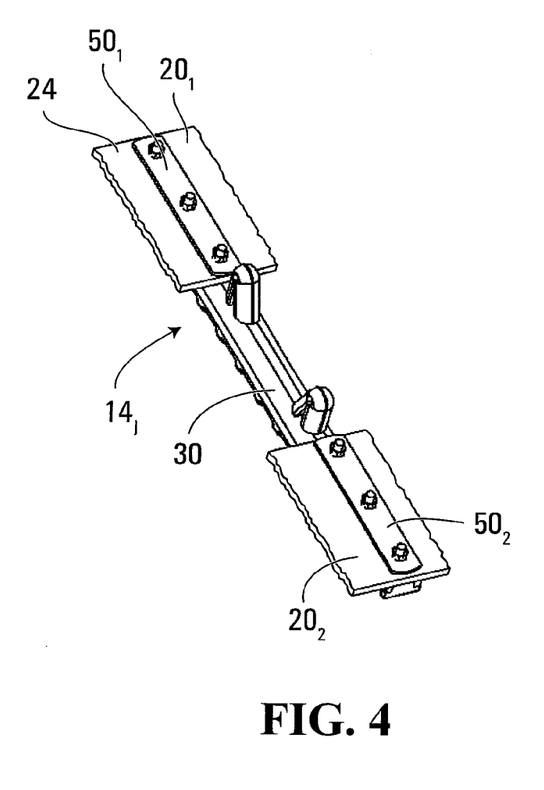
Figure 5:
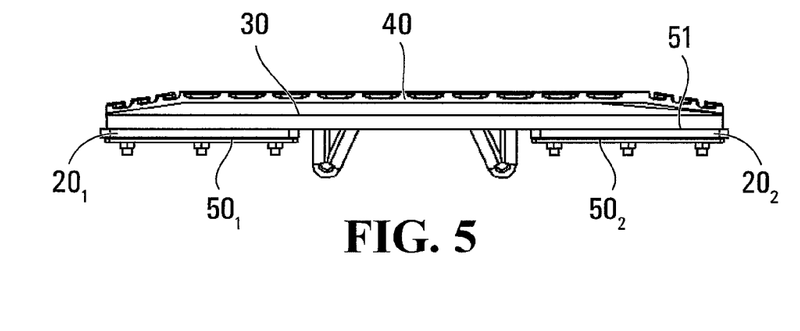
FIGS. 5 and 6 respectively show a front view and a side view of the cross-link shown in FIGS. 3 and 4.
Figure 6:
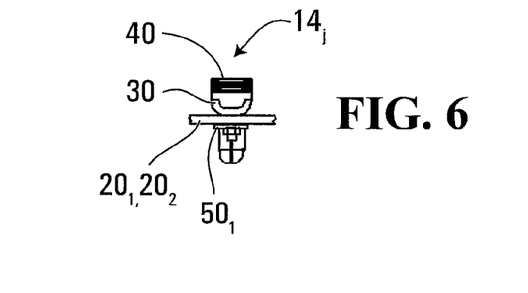
Figure 7:
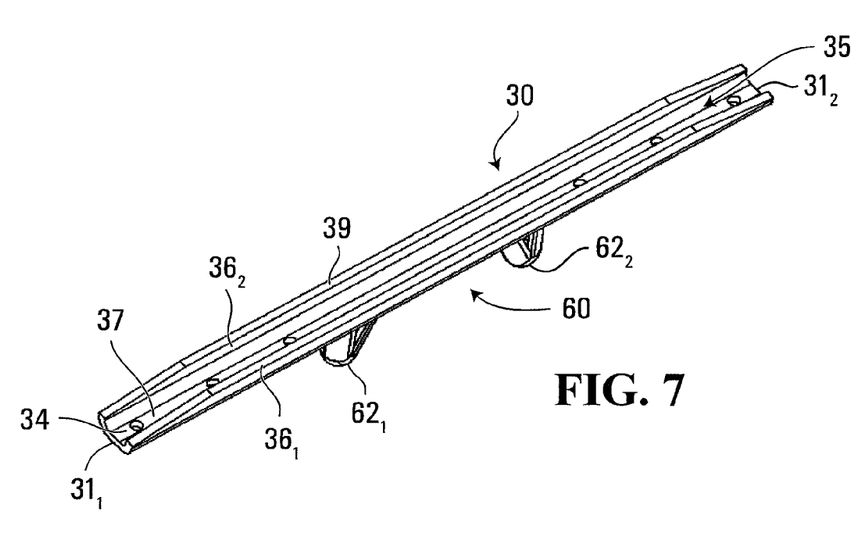
FIGS. 7 and 8 show different perspective views of an elongate member of the cross-link shown in FIGS. 3 and 4.
Figure 8:
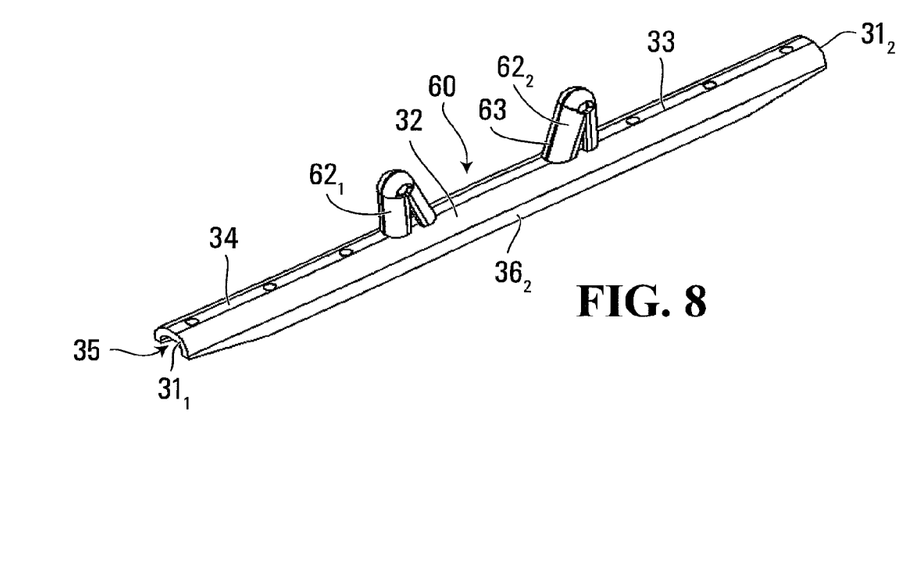
Figure 9:
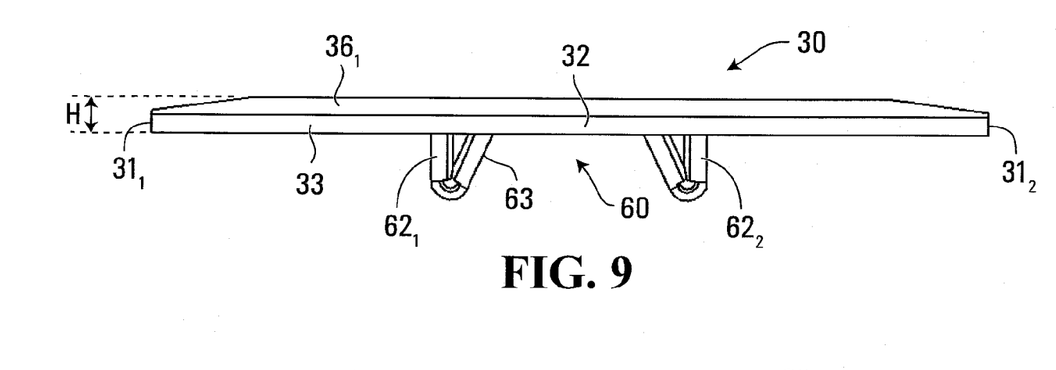
FIGS. 9 to 12 respectively show a front view, a top view, a bottom view and a side view of the elongate member shown in FIGS. 7 and 8.
Figure 10:
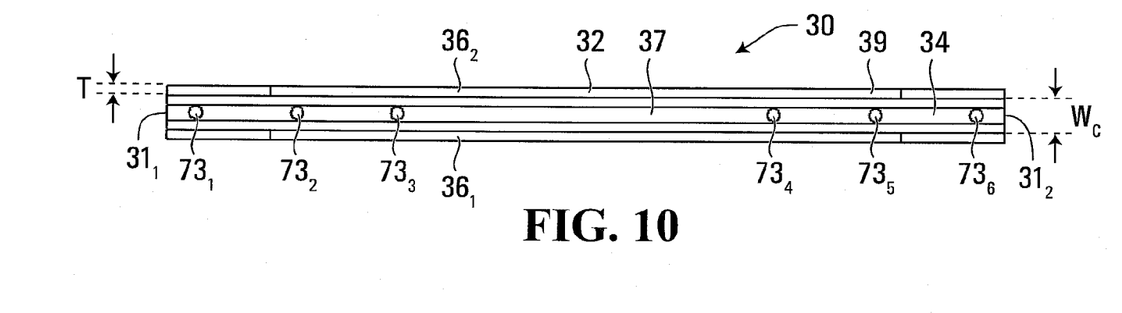
Figure 11:
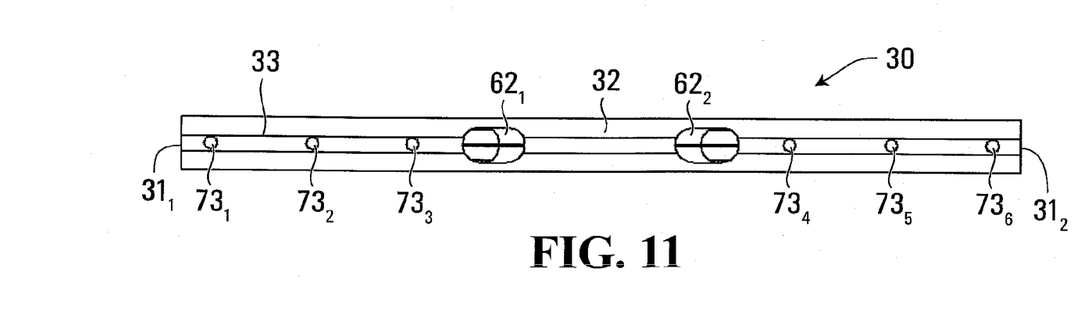
Figure 12:
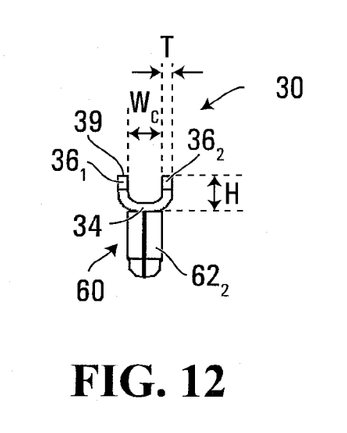
Figure 13:
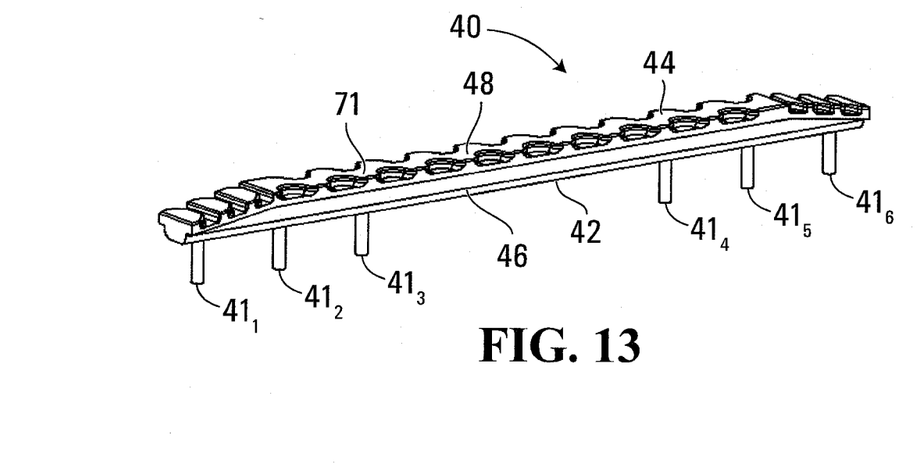
FIGS. 13 and 14 show different perspective views of a sole of the cross-link shown in FIGS. 3 and 4.
Figure 14:
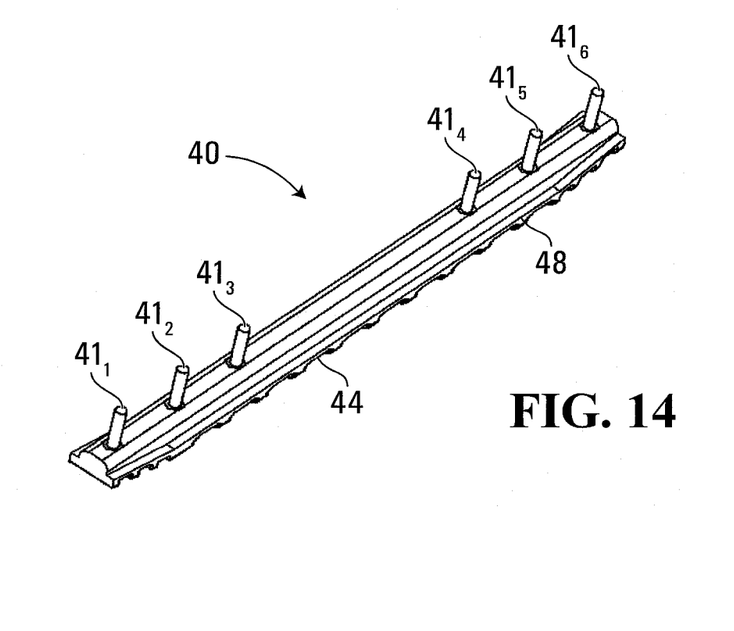
Figure 15:
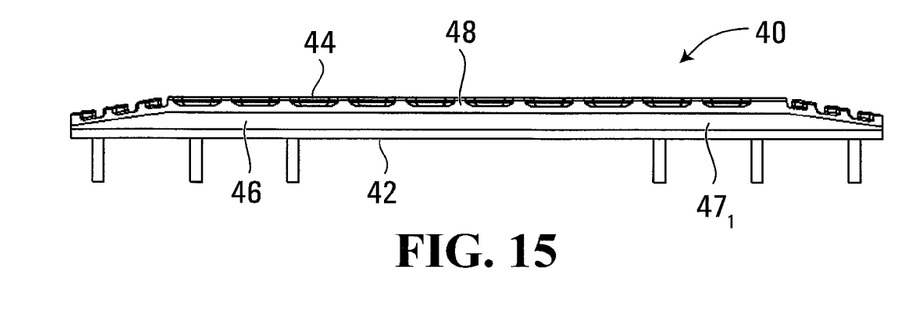
FIGS. 15 to 18 respectively show a front view, a top view, a bottom view and a side view of the sole shown in FIGS. 13 and 14.
Figure 16:
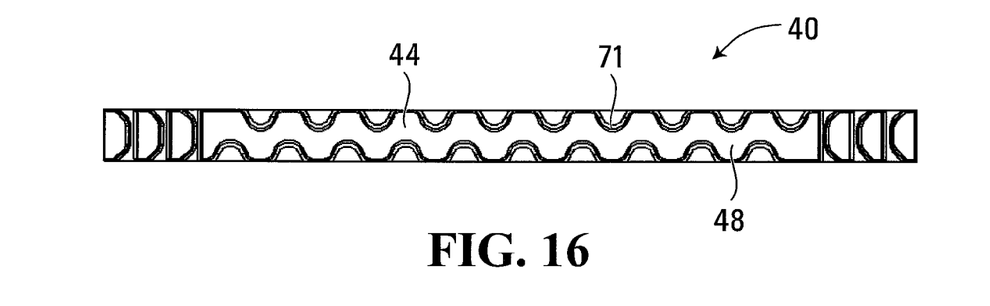
Figure 17:
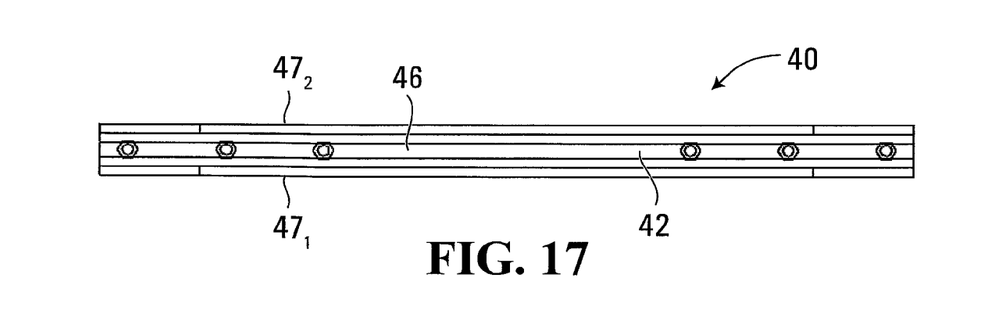
Figure 18:
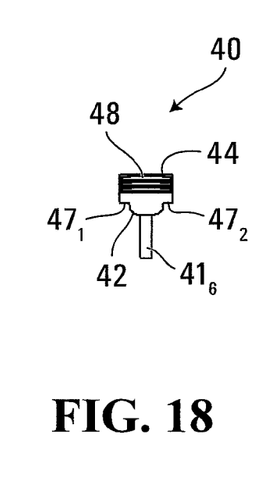
Figure 19:
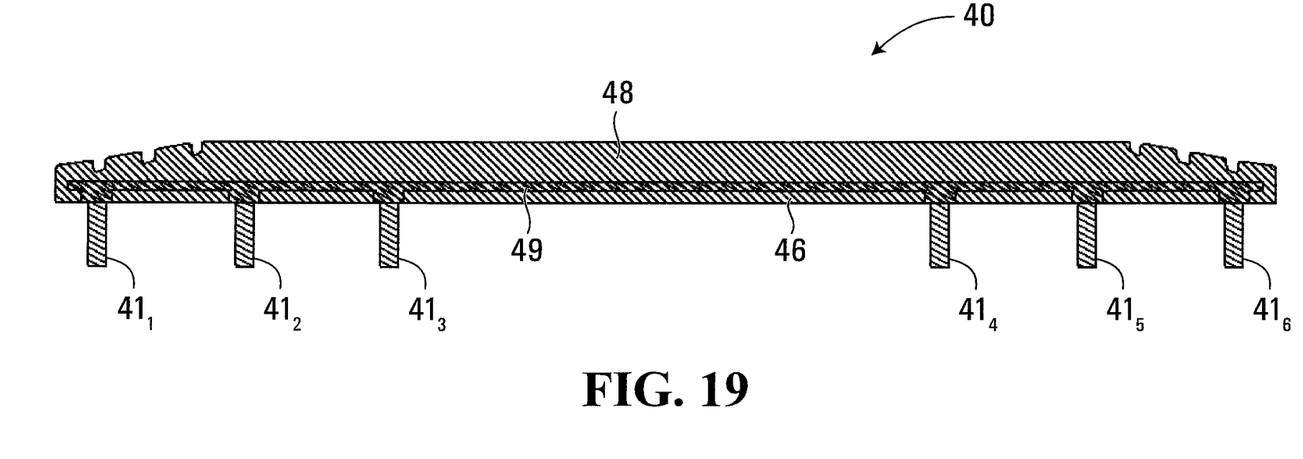
FIG. 19 shows a front cross-sectional view of the sole shown in FIGS. 13 and 14.

As shown in FIG. 2, in this embodiment, each track $12_j$ (j=1 or 2) comprises a pair of belts $20_1$, $20_2$ spaced apart from one another to accommodate the drive wheel $18_j$, the idler wheel $19_j$ and the support wheels $21_{j-1}$-$21_{j-4}$ of the tracked vehicle 10. In addition, the track $12_j$ comprises a series of cross-links $14_1$-$14_N$ distributed longitudinally along the track $12_j$ and extending transversally to interconnect the belts $20_1$, $20_2$.

Each of the belts $20_1$, $20_2$ has an inner side 24 facing the wheels $18_j$, $19_j$, $21_{j-1}$-$21_{j-4}$ and defining an inner area 15 of the track $12_j$ in which these wheels are located. Each of the belts $20_1$, $20_2$ also has an outer, ground-facing side 25 opposite the inner side 24 and facing the ground surface on which the tracked vehicle 10 travels. In this embodiment, each of the belts $20_1$, $20_2$ comprises a continuous length of rubber closed to form the belt. In other embodiments, the belts $20_1$, $20_2$ may have various other constructions. For example, each of the belts $20_1$, $20_2$ may comprise a plurality of parts (e.g., rubber and/or metallic sections) interconnected to one another to form the belt. Also, while in this embodiment the track $12_j$ comprises the two belts $20_1$, $20_2$, in other embodiments, the track $12_j$ may comprise three or more such belts.

The cross-links $14_1$-$14_N$ interconnect the belts $20_1$, $20_2$ and interact with the wheels $18_j$, $19_j$, $21_{j-1}$-$21_{j-4}$ as the track $12_j$ moves in the endless path around these wheels. In particular, the cross-links $14_1$-$14_N$ interact with the drive wheel $18_j$ to cause the track $12_j$ to be driven by the drive wheel $18_j$. More specifically, in this case, as the drive wheel $18_j$ rotates, individual ones of the cross-links $14_1$-$14_N$ engage recesses in the drive wheel $18_j$ which causes the track $12_j$ to be driven in the endless path around the wheels $18_j$, $19_j$, $21_{j-1}$-$21_{j-4}$. In addition, as the track $12_j$ moves around the endless path, individual ones of the cross-links $14_1$-$14_N$ located on a lower run of the track $12_j$ engage the ground surface and thus contribute to traction of the tracked vehicle 10 on the ground surface.

With additional reference to FIGS. 3 to 19, in this embodiment, each cross-link $14_i$ ($1 \le i \le N$) comprises an elongate member 30, a sole 40, and a pair of backing parts $50_1$, $50_2$. As further discussed below, the sole 40 can be used when the tracked vehicle 10 is to travel on a hard surface (e.g., a paved surface) in order to minimize an impact of the cross-link $14_i$ on that surface. When the tracked vehicle 10 is to travel on a soft surface (e.g., mud, earth), the sole 40 can be removed to allow the elongate member 30 to provide enhanced traction on that surface.

The elongate member 30 is configured to be mounted to the belts $20_1$, $20_2$ to interconnect the belts $20_1$, $20_2$. In addition, the elongate member 30 also serves to transmit forces resulting from rotational motion of the drive wheel $18_j$ to the track $12_j$ in order to cause motion of the track $12_j$.

More particularly, the elongate member 30 comprises a first end $31_1$, a second end $31_2$ and a central portion 32 therebetween. The central portion 32 of the elongate member 30 comes into contact with and engages the drive wheel $18_j$, which applies force to the cross-link $14_i$ and causes motion of the track $12_j$ in the same general direction as the rotational direction of the drive wheel $18_i$.

The elongate member 30 comprises a belt-engaging face 33 that is in contact with the ground-facing side 25 of the belts $20_1$, $20_2$, when the elongate member 30 is mounted to the belts $20_1$, $20_2$. In this embodiment, the belt-engaging face 33 is mainly flat, which may allow the weight of the tracked vehicle 10 to be distributed across the entire elongate member 30, providing the tracked vehicle 10 with a generally low ground pressure that may prove advantageous on certain ground surfaces.

The elongate member 30 also comprises a bottom portion 34 and a pair of sidewalls $36_1$, $36_2$ that lie opposite to one another on either side of the bottom portion 34 to create a channel 35. As further discussed later on, the channel 35 helps to receive and retain the sole 40 when the sole 40 is used as part of the cross-link $14_i$.

The bottom portion 34 comprises a sole-engaging surface 37 that extends from the first end $31_1$ to the second end $31_2$ of the elongate member 30 and that is in contact with the sole 40 when the sole 40 is used as part of the cross-link $14_i$. In this case, the sole-engaging surface 37 is generally flat such that, as the sole 40 contacts the sole-engaging surface 37 when mounted in the channel 35, there is a planar interface (i.e., contact points lying in a common plane) between the sole 40 and the bottom portion 34 from the first end $31_1$ to the second end $31_2$ of the elongate member 30, which may allow a more uniform distribution of forces when the tracked vehicle 10 travels.

A plurality of holes $73_1$-$73_6$ pass through the bottom portion 34 to receive fasteners that allow mounting of the elongate member 30 to the belts $20_1$, $20_2$. More particularly, in this embodiment, the holes $73_1$-$73_6$ are divided equally between two (2) sets. Each set is located in one lateral portion of the elongate member 30, so that a first set with the holes $73_1$-$73_3$ is located in a first lateral portion proximate the first end $31_1$, while a second set with the holes $73_4$-$73_6$ is located in a second lateral portion proximate the second end $31_2$. In other embodiments, the elongate member 30 may have a different number of holes and/or a different arrangement of such holes.

The sidewalls $36_1$, $36_2$ are configured to, on the one hand, enhance retention of the sole 40 when it is used as part of the cross-link $14_i$ and, on the other hand, enhance a traction effect of the elongate member 30 in the ground surface on which the tracked vehicle 10 travels when the sole 40 is not used. Each of the sidewalls $36_1$, $36_2$ extends from the bottom portion 34 to a terminating edge 39.

More particularly, in this embodiment, the sidewalls $36_1$, $36_2$ are configured such that the channel 35 has a substantially constant width $W_c$ from the first end $31_1$ to the second end $31_2$ (while in practice there may be some slight variation in the width $W_c$ of the channel 35 due to manufacturing of the elongate member 30, the width $W_c$ is substantially constant in that it does not change from a macroscopic point of view). Specifically, in this case, the sidewalls $36_1$, $36_2$ have inner surfaces that are generally parallel to one another such that the width $W_c$ of the channel 35 is substantially constant. Maintaining this substantially constant width $W_c$ throughout the channel 35 along its entire length allows the elongate member 30 to be sturdier, facilitates its manufacturing, and provides a better interface with and retention of the sole 40 within the channel 35 when the sole 40 is used as part of the cross-link $14_i$.

Each of the sidewalls $36_1$, $36_2$ has a height H (measured from the belt-engaging face 33 to its terminating edge 39) providing the channel 35 with an internal height that enhances retention of the sole 40 therein when the sole 40 is mounted therein. The height H of each of the sidewalls $36_1$, $36_2$ also allows that sidewall to act as an aggressive traction element on the ground surface on which the tracked vehicle 10 travels, when the sole 40 is not used as part of the cross-link $14_i$. For example, in some embodiments, the height H of each of the sidewalls $36_1$, $36_2$ may be of at least 30 mm, and in some cases 35 mm or more, to provide such desired enhanced retention of the sole 40 when it is used and aggressive traction effect when the sole 40 is not used. The height H may take on various other values in other embodiments.

In addition to the height H of the sidewalls $36_1$, $36_2$, when the sole 40 is not used as part of the cross-link $14_i$, the terminating edge 39 of each sidewall engages the ground surface on which the tracked vehicle 10 travels to form a region of localized pressure on the ground surface which enhances traction of the tracked vehicle 10.

Also, in this case, the height H of the sidewalls $36_1$, $36_2$ is such that, when the sole 40 is not used as part of the cross-link $14_i$, any fasteners that are used to secure the elongate member 30 to the belts $20_1$, $20_2$ remain recessed within the channel 35, i.e., do not extend higher than the sidewalls $36_1$, $36_2$. Since repeated contact between any part of a fastener that extended outside of the channel 35 and a hard ground surface (e.g., a paved road or sidewalk) could cause impact on the ground surface, the height H of the sidewalls $36_1$, $36_2$ helps reduce potential damage from the cross-link $14_i$ on such a surface. Moreover, such contact between any part of a fastener outside of the channel 35 and a hard ground surface could also cause unnecessary wear to and decrease operational life of such fasteners, and thus the height H of the sidewalls $36_1$, $36_2$ also helps to extend the operational life of the fasteners when the sole 40 is not used as part of the cross-link $14_i$.

In this embodiment, the sidewalls $36_1$, $36_2$ decrease in height proximate the first end $31_1$ and the second end $31_2$ of the elongate member 30. That is, each of the sidewalls $36_1$, $36_2$ has a first tapering end portion leading to the first end $31_1$ and a second tapering end portion leading to the second end $31_2$. These tapering end portions can facilitate turning of the cross-link $14_i$ when the tracked vehicle 10 and the track $12_j$ turn. Thus, in this and other embodiments where the sidewalls $36_1$, $36_2$ vary in height along their length, the height H of each of the sidewalls $36_1$, $36_2$ can be taken as a maximum height of that sidewall along its length. Also, although in this embodiment both of the sidewalls $36_1$, $36_2$ have the same height H, in some embodiments, the sidewalls $36_1$, $36_2$ may have different heights H.

Each of the sidewalls $36_1$, $36_2$ also has a thickness T (taken as its average thickness along its height H) which provides sufficient strength and rigidity to that sidewall to allow it properly retain the sole 40 when the sole 40 is mounted in the channel 35 and to allow it to withstand forces exerted thereon while acting as a traction element when the sole 40 is not used as part of the cross-link $14_i$. For example, in some embodiments, the thickness T of each of the sidewalls $36_1$, $36_2$ may be of 7.5 mm, and in some cases of at least 9.5 mm, to provide such desired enhanced retention of the sole 40 when it is used and aggressive traction effect when the sole 40 is not used. The thickness T may take on various other values in other embodiments. Also, while in this embodiment both of the sidewalls $36_1$, $36_2$ have the same thickness T, in other embodiments, the sidewalls $36_1$, $36_2$ may have different thicknesses T.

The height H and the thickness T of each of the sidewalls $36_1$, $36_2$ can thus be selected to allow the sidewalls $36_1$, $36_2$ to both enhance retention of the sole 40 when it is used as part of the cross-link $14_i$ and act as an aggressive traction element when the sole 40 is not used as part of the cross-link $14_i$. For example, each of the sidewalls $36_1$, $36_2$ may have a height-to-thickness ratio H/T of at least 3.0, and in some cases 3.5 or more, to provide such desired enhanced retention of the sole 40 when it is used and aggressive traction effect when the sole 40 is not used, while maintaining sufficient strength and rigidity.

In this embodiment, the elongate member 30, including the bottom portion 34 and the sidewalls $36_1$, $36_2$, is created by stamping, in this case bending, a single piece of material to form the elongate member 30. More particularly, in this embodiment, the single piece of material is a flat piece of metal, in this case high-strength steel, which is bent into shape. Various bending techniques, involving plastic deformation of the single piece of metal about a linear axis with little or no change in its surface area, are well known can be used for this process. These bending techniques can facilitate manufacturing of the elongate member 30 and allow proper formation of the sidewalls $36_1$, $36_2$ with a height-to-thickness H/T ratio as described above.

While in this embodiment the elongate member 30 comprises a single metallic component that is formed and shaped through a stamping process, in other embodiments, the elongate member 30 may be produced using various other processes and may comprise a plurality of components that are interconnected to one another, such as through welding, and that are made of the same material or different material. For example, in some embodiments, the sidewalls $36_1$, $36_2$ and the bottom portion 34 may each be produced separately and then welded together to form the elongate member 30.

With continued reference to FIGS. 1A to 19, in this embodiment, the cross-link $14_i$ comprises a wheel guide 60 to engage individual ones of the wheels $18_j$, $19_j$, $21_{j-1}$-$21_{j-4}$ as the track $12_j$ moves in the endless path around these wheels. The wheel guide 60 comprises a pair of projections $62_1$, $62_2$ that are spaced apart from one another and that extend from the belt-engaging face 33 and opposite the ground-facing side 25, i.e., from the belt-engaging face 33 towards the inner area 15 of the track $12_j$.

As the track $12_j$ moves along its endless path, each of the wheels $18_j$, $19_j$, $21_{j-1}$-$21_{j-4}$ passes through the wheel guide 60, and in particular, between the projections $62_1$, $62_2$ that are located on either side of these wheels. The projections $62_1$, $62_2$ can interact with the wheels $18_j$, $19_j$, $21_{j-1}$-$21_{j-4}$ to keep the cross-link $14_i$ centered by opposing any lateral movement outside of a space between these projections. As a result, the projections $62_1$, $62_2$ help to laterally guide the track $12_j$ as it moves along its endless path.

In this embodiment, when viewed from a front or rear of the elongate member 30, each of the projections $62_1$, $62_2$ has a triangular shape, in this case resembling a right-angle triangle, with a wheel-facing face 63 that faces individual ones of the wheels $18_j$, $19_j$, $21_{j-1}$-$21_{j-4}$ as the track $12_j$ moves along its endless path. The wheel-facing face 63 of each of the projections $62_1$, $62_2$ lies at an obtuse angle relative to the belt-engaging face 33, which can help center the elongate member 30 (and therefore the cross-link 14) as it comes into contact with any of the wheels $18_j$, $19_j$, $21_{j-1}$-$21_{j-4}$. More specifically, any lateral motion of the elongate member 30 towards outside of the space between the projections $62_1$, $62_2$ will be counteracted when the wheel-facing face 63 of one of the projections $62_1$, $62_2$ comes into contact with one of the wheels $18_j$, $19_j$, $21_{j-1}$-$21_{j-4}$, thus guiding the elongate member 30 back towards a center region of the space between the projections $62_1$, $62_2$. Through these components, the track $12_j$ can thus remain laterally centered between the projections $62_1$, $62_2$ and so remain on its endless path.

While in this embodiment the projections $62_1$, $62_2$ are configured as right-angled triangles, in other embodiments, the projections $62_1$, $62_2$ may have various other shapes. For example, in some embodiments, the projections $62_1$, $62_2$ may be configured as non-right-angled triangles (e.g., isosceles or equilateral triangles). Also, in some embodiments, the wheel-facing face 63 may define an arc that approximates a profile of the wheels $18_j$, $19_j$, $21_{j-1}$-$21_{j-4}$.

In this embodiment, the projections $62_1$, $62_2$ are made of metallic material, in this case 4140 high-strength steel, and are secured to the elongate member 30 by welding them to the belt-engaging face 33. In other embodiments, the projections $62_1$, $62_2$ may be made of various other materials and/or may be secured to the elongate member 30 in various other ways, such as via nut and bolt fasteners. In yet other embodiments, the projections $62_1$, $62_2$ may be integrally formed with the elongate member 30.

With continued reference to FIGS. 1A to 19, the sole 40 can be mounted to the elongate member 30 when the tracked vehicle 10 is to travel on a hard surface (e.g., a paved surface) in order to minimize an impact of the cross-link $14_i$ on that surface. More particularly, the sole 40 comprises an inner side 42 for facing the elongate member 30 to mount the sole 40 to the elongate member 30 and an outer side 44 opposite the inner side 42 for engaging the ground surface on which the tracked vehicle 10 moves. In this embodiment, the sole 40 is mounted to the elongate member 30 via a plurality of fasteners $41_1$-$41_6$ extending from the inner side 42 to the elongate member 30.

The sole 40 comprises a base portion 46 that is mountable within the channel 35 of the elongate member 30 and a ground-engaging portion 48 for engaging the ground surface on which the tracked vehicle 10 travels. In this case, certain sections of the ground-engaging portion 48 (e.g., extremities corresponding to the first end $31_1$ and the second end $31_2$ of the elongate member 30) may not always engage the ground surface, but may rather only come into contact with the ground surface in situations where the tracked vehicle 10 is resting on an incline and/or a soft surface (such as mud) where the elongate member 30 and/or the sole 40 are partially submerged.

More particularly, in this embodiment, the base portion 46 of the sole 40 comprises a pair of sidewall-engaging surfaces $47_1$, $47_2$ for engaging the sidewalls $36_1$, $36_2$ of the elongate member 30 when the sole 40 is mounted in the channel 35. Thus, in this case, the sidewall-engaging surfaces $47_1$, $47_2$ are generally parallel to one another and separated by a distance corresponding to the substantially constant width $W_c$ of the channel 35 to allow the base portion 46 of the sole 40 to fit within the channel 35. When the base portion 46 is mounted within the channel 35, the sidewall-engaging surfaces $47_1$, $47_2$ contact the sidewalls $36_1$, $36_2$ (and in this case the sole-engaging surface 37) of the elongate member 30, which helps retains the sole 40 in the channel 35 when the cross-link $14_i$ is subjected to forces as the tracked vehicle 10 moves on the ground surface.

Also, in this embodiment, the ground-engaging portion 48 comprises elastomeric material for engaging the ground surface on which the tracked vehicle 10 moves. More specifically, in this embodiment, the elastomeric material of the ground-engaging portion 48 is rubber, which can be any natural, synthetic, or modified high polymer with elastic properties, such as acrylate rubber, acrylic rubber, acrylonitrile rubber, acrylonitrile-butadiene rubber or butadiene rubber. In other embodiments, any other suitable elastomeric material may be used.

When the ground surface is hard (e.g., a paved road), the rubber of the ground-engaging portion 48 helps minimize effects of the cross-link $14_i$ as it comes into repeated contact with the hard ground surface, while providing traction for the tracked vehicle 10 to travel along such a surface. In fact, the rubber of the ground-engaging portion 48 enhances traction of the sole 40 by "gripping" the ground surface on which the tracked vehicle 10 travels, in particular when the ground surface includes one or more inclined surfaces that may need to be traversed, such as steep paths that run up hills or down gullies.

In this case, the ground-engaging portion 48 comprises a tread pattern 71 which may assist in improving traction of the tracked vehicle 10 on a variety of ground surfaces. The tread pattern 71 may also allow channeling of water or other liquids away from that section of the ground-engaging portion 48 that is in contact with a wet ground surface, which may improve handling of the tracked vehicle 10 under wet or adverse weather conditions. Also, the tread pattern 71 is configured such that it lacks spaces in which rocks or other hard objects could become trapped in when it contacts the ground surface.

For its part, in this embodiment, the base portion 46 of the sole 40 is also made of the same elastomeric material (in this case, rubber) as that of the ground-engaging portion 48. In fact, in this embodiment, the base portion 46 and ground-engaging portion 48 of the sole 40 constitute a single rubber component. The rubber of the base portion 46 helps in retaining the sole 40 in the channel 35.

In other embodiments, the base portion 46 may be a component distinct from but connected to the ground-engaging portion 48 and may be made of a material different than that of the ground-engaging portion 48. For example, the base portion 46 may contain a rigid material, such as ultra-high molecular weight (UHMW) plastic or another rigid plastic, while the ground-engaging portion 48 may contain the elastomeric material and be secured to the base portion 46 through one or more fasteners (e.g., screws or nuts/bolts) or some bonding technique (e.g., glue or epoxy).

When the sole 40 is used as part of the cross-link $14_i$, it is mounted to the elongate member 30 via the fasteners $41_1$-$41_6$ that extend from its inner side 42. In this embodiment, the fasteners $41_1$-$41_6$ are integrated with the sole 40. More particularly, in this case, the sole 40 comprises a frame member 49 which acts as an armature on which the rubber of the sole 40 is supported. The frame member 49, which may be made of any suitable rigid material (e.g., steel), also supports the fasteners $41_1$-$41_6$, which, for instance, can be threaded into or welded to the frame member 49.

The frame member 49, which may be made of any suitable rigid material (e.g., steel), supports the fasteners $41_1$-$41_6$. For example, the fasteners $41_1$-$41_6$ may be attached to the frame member 49 by screwing one of their ends into the frame member 49 or by welding one of their ends directly to the frame member 49. Alternatively, the fasteners $41_1$-$41_6$ may be integrally formed with the frame member 49. In any event, the fasteners $41_1$-$41_6$ and the frame member 49 are combined in a way that allows their integration with other components of the sole 40.

The fasteners $41_1$-$41_6$ are arranged on the frame member 49 in such a way that each fastener may be aligned with one of the holes $73_1$-$73_6$ of the elongate member 30. More particularly, in this case, the fasteners $41_1$-$41_6$ are divided equally between two (2) sets that are located in respective lateral portions of the sole 40 to match the two (2) sets of holes $73_1$-$73_3$ and $73_4$-$73_6$ of the elongate member 30. In this way, the fasteners $41_1$-$41_6$ may be used to mount the sole 40 to the elongate member 30 and thus mount the cross-link $14_i$ to the belts $20_1$, $20_2$.

In this embodiment, the rubber used to form the base portion 46 and the ground-engaging portion 48 of the sole 40 is molded around the frame member 49 and the fasteners $41_1$-$41_6$. In addition to facilitating manufacturing of the sole 40, this integration of the frame member 49 and the fasteners $41_1$-$41_6$ with a remainder of the sole 40 (i.e., the base portion 46 and the ground-engaging portion 48) help simplify and speed up mounting and dismounting of the sole 40 to and from the elongate member 30.

Also, in this embodiment, the outer side 44 of the sole 40 lacks holes through which the fasteners $41_1$-$41_6$ are exposed when the sole 40 is mounted to the elongate member 30. This lack of holes on the outer side 44 of the sole 40 prevents rocks and other objects from being trapped in the outer side 44 of the sole 40, which could otherwise contribute to damaging a hard ground surface (e.g., a paved road) on which the tracked vehicle 10 travels under the vehicle's weight.

More specifically, in this case, since a first end of each of the fasteners $41_1$-$41_6$ is attached to the frame member 49, around which the rubber of the sole 40 is molded, only a second end of each fastener is exposed. In other words, the sole 40 can be viewed as defining a plurality of blind holes that extend from the inner side 42 without reaching the outer side 44, in which are received the fasteners $41_1$-$41_6$. As a result, when the sole 40 is mounted to the elongate member 30, the outer side 44 of the sole 40 lacks holes through which the first end of the fasteners $41_1$-$41_6$ would otherwise be exposed. This seamless nature of the outer side 44 prevents rocks and other small objects from becoming trapped within such holes and also protects the fasteners $41_1$-$41_6$ from damage from such debris, which may extend their operational life.

While in this embodiment the fasteners $41_1$-$41_6$ are integrated with the sole 40, in other embodiments, separate fasteners may be used to mount the sole 40 to the elongate member 30 (e.g., by screwing them into the base portion 46 of the sole 40 from its inner side 24). Also, when the sole 40 is not used as part of the cross-link $14_i$, the elongate member 30 may be mounted to the belts $20_1$, $20_2$ via separate fasteners or a frame member similar to the frame member 49 supporting a plurality of fasteners.

With continued reference to FIGS. 1A to 19, the backing parts $50_1$, $50_2$ are configured to be mounted to the belts $20_1$, $20_2$ to assist the elongate member 30 in interconnecting the belts $20_1$, $20_2$. Each of the backing parts $50_1$, $50_2$ has a belt-engaging face 51 that contacts a respective one of the belts $20_1$, $20_2$ on its inner side 24 when the backing part is mounted to that belt. Thus, when the cross-link $14_j$ is mounted to the belts $20_1$, $20_2$, the belts $20_1$, $20_2$ are sandwiched between the belt-engaging face 33 of the elongate member 30 and the belt-engaging face 51 of each of backing parts $50_1$, $50_2$.

In this embodiment, the backing parts $50_1$, $50_2$ are metallic plates that may be formed from any suitably rigid metallic material, such as steel. Each of the parts $50_1$, $50_2$ is pierced with a plurality of holes $80_1$-$80_3$ to receive fasteners, such as the fasteners $41_1$-$41_6$ of the sole 40 or separate fasteners when the sole 40 is not used. In this way, the backing parts $50_1$, $50_2$ may be used to interconnect the elongate member 30 (and the sole 40, when used) to the belts $20_1$, $20_2$.

It will thus be appreciated that the cross-link $14_i$ (and other ones of the cross-links $14_i$-$14_N$) can conveniently be mounted to the belts $20_1$, $20_2$ to interconnect them. A portion of each of the belts $20_1$, $20_2$ is designed to lie between the belt-engaging face 33 of the elongate member 30 on one side (i.e., the ground-facing side 25) and the belt-engaging face 51 of one of the backing parts $50_1$, $50_2$ on the other side (i.e., the inner side 24). Holes in the belts $20_1$, $20_2$ allow alignment of the holes $73_1$-$73_6$ of the elongate member 30 and the holes $80_1$-$80_3$ of the backing parts $50_1$, $50_2$ that sandwich the belts. When suitably aligned, a fastener (e.g., $41_1$) inserted through one of the holes $73_1$-$73_6$ of the elongate member 30 emerges through the belt-engaging face 33, passes through the corresponding hole in the belt ($20_1$ or $20_2$), and then emerges through the corresponding hole (e.g., $80_1$) in the belt-engaging face 51.

When the holes $73_1$-$73_6$ of the elongate member 30 are so aligned with the holes in the belts $20_1$, $20_2$, the elongate member 30 lies transversely across the ground-facing side 25 of each of the belts. Each of the backing parts $50_1$, $50_2$ lies transversely across the inner side 24 of one of the belts $20_1$, $20_2$. In this configuration, the elongate member 30 and the backing parts $50_1$, $50_2$ are appropriately aligned with the belts $20_1$, $20_2$. The fasteners $41_1$-$41_6$ are used to attach these components together and thus form the cross-link $14_i$ with the sole 40 mounted thereon.

The base portion 46 of the sole 40 fits within the channel 35 of the elongate member 30 to allow mounting of the sole 40 to the elongate member 30. Thus, when the sole 40 is mounted to the member 30: the sidewall-engaging surfaces $47_1$, $47_2$ of the sole 40 engage the sidewalls $36_1$, $36_2$ of the elongate member 30; the inner side 42 of the sole 40 comes into contact with the flat sole-engaging surface 37 of the elongate member 30; and each of the fasteners $41_1$-$41_6$ attached to the frame member 49 enclosed within the sole 40 may penetrate its corresponding one of the holes $73_1$-$73_6$ of the elongate member 30.

In particular, when the sole 40 is mounted, the exposed end of each of the fasteners $41_1$-$41_6$ passes through a corresponding one of the holes $73_1$-$73_6$ of the elongate member 30, then passes through one or the holes of the belts $20_1$, $20_2$ and finally passes through a corresponding one of the holes $80_1$-$80_3$ in one of the backing parts $50_1$, $50_2$. Tightening the fasteners $41_1$-$41_6$ (e.g., through the use of a threaded nut) to a suitable amount sandwiches the belts $20_1$, $20_2$ between the backing parts $50_1$, $50_2$ and the elongate member 30 to which the sole 40 is mounted, thereby securing the cross-link $14_i$ to the belts $20_1$, $20_2$.

While this example included the sole 40 as part of the cross-link $14_i$, there may be some situations where the sole 40 may be purposely excluded. For example, the sole 40 may be excluded from the cross-link $14_i$ in a situation where enhanced traction is required, such as when the tracked vehicle 10 must traverse a very soft ground surface, such as travelling through sand or mud.

In such situations, the sole 40 may be removed from the cross-link $14_i$ (or not mounted thereon to begin with) to provide the enhanced traction needed to move across such surfaces. To remove the sole 40, the fasteners $41_1$-$41_6$ that are integrated with the sole 40 (via the frame member 49) are first loosened to the point where they allow movement, such as by loosing and/or removing a nut from each fastener.

With the fasteners $41_1$-$41_6$ having been loosened, the sole 40 may remain mounted to the elongate member 30 in the channel 35 due to engagement between the sidewall-engaging surfaces $47_1$, $47_2$ of the sole 40 and the sidewalls $36_1$, $36_2$ of the elongate member 30. By pulling on the sole 40 (on the ground-engaging portion 48) in a perpendicularly opposite direction to the belts $20_1$, $20_2$, the engagement between the base portion 46 of the sole 40 and the channel 35 of the elongate member 30 may be removed to allow removal of the sole 40. As the sole 40 is removed, the fasteners $41_1$-$41_6$ pass through the holes $80_1$-$80_3$ in the backing parts $50_1$, $50_2$, then through the holes in the belts $20_1$, $20_2$, and finally through the holes $73_1$-$73_6$ of the elongate member 30.

Once the sole 40 is removed, the fasteners $41_1$-$41_6$ must be replaced with a second set of fasteners to keep the cross-link $14_i$ mounted to the belts $20_1$, $20_2$. This second set of fasteners may be provided individually or via a frame member that is similar to the frame member 49, as mentioned previously. If fasteners in the second set of the fasteners are provided individually, one end of each fastener is fed through a corresponding one of the holes $73_1$-$73_6$ of the elongate member 30, then through a corresponding one of the holes in the belts $20_1$, $20_2$, and then through a corresponding one of the holes $80_1$-$80_3$ in the backing parts $50_1$, $50_2$, while its other end is secured within the channel 35 (e.g., via a suitable nut). Alternatively, if the second set of fasteners is provided via a frame member that is similar to the frame member 49, the exposed ends of these fasteners are first aligned with the holes $73_1$-$73_6$ in the bottom portion 34 of the elongate member 30. Upon insertion of the frame member into the channel 35 of the elongate member 30, the fasteners linked to this frame member pass through the components of the cross-link $14_i$ and the belts $20_1$, $20_2$ in a manner similar to that described above and are suitably tightened (e.g., through threaded nuts) to keep the belts $20_1$, $20_2$ sandwiched between the backing parts $50_1$, $50_2$ and the elongate member 30, which keeps the cross-link $14_i$ mounted to the belts $20_1$, $20_2$ without the use of the sole 40.

It will thus be appreciated that this ability to mount and dismount the sole 40 from elongate member 30 allows the tracked vehicle 10 to traverse a wide variety of ground surfaces with improved traction while minimizing impact on the traversed surface.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A cross-link for a track of a tracked vehicle, the track comprising belts spaced apart to accommodate a plurality of wheels of the tracked vehicle, the belts having a ground-facing side for facing a ground surface on which the tracked vehicle travels, the cross-link comprising:
   an elongate member for mounting to the belts to interconnect the belts, the elongate member having a belt-engaging face contacting the belts on the ground-facing side when the elongate member is mounted to the belts, the elongate member defining a channel, the channel comprising a bottom portion, a pair of sidewalls extending from the bottom portion, and a top which is open between the sidewalls, the top of the channel being located below the bottom portion of the channel when the cross-link engages the ground surface; and
   a wheel guide comprising a pair of guide projections spaced apart from one another, the wheel guide being connected to the elongate member such that, when the elongate member is mounted to the belts, a connection of the wheel guide and the elongate member is located between the belts, the guide projections projecting away from the belt-engaging face and opposite the ground-facing side, the wheel guide being capable of engaging the wheels of the tracked vehicle as the tracked vehicle travels over the track such that, when the wheel guide engages a given one of the wheels, the given one of the wheels is received between the guide projections.

2. A cross-link as claimed in claim 1, the wheel guide being connected to the elongate member by being welded to the elongate member.

3. A cross-link as claimed in claim 1, each of the guide projections comprising a wheel-facing face for facing the given one of the wheels received between the guide projections, the wheel-facing face defining an obtuse angle with the belt-engaging face.

4. A cross-link as claimed in claim 1, the elongate member having a first end and a second end, the channel having a substantially constant width between the sidewalls from the first end to the second end.

5. A cross-link as claimed in claim 1, each of the sidewalls having a height, measured relative to the belt-engaging face, of at least 30 mm.

6. A cross-link as claimed in claim 5, the height of each of the sidewalls being at least 35 mm.

7. A cross-link as claimed in claim 1, each of the sidewalls having a height and a thickness, the height being measured relative to the belt-engaging face, each of the sidewalls having a height-to-thickness ratio of at least 3.0.

8. A cross-link as claimed in claim 7, the height-to-thickness ratio of each of the sidewalls being at least 3.5.

9. A cross-link as claimed in claim 1, the sidewalls being stamped sidewalls.

10. A cross-link as claimed in claim 3, each of the guide projections comprising a second face opposite the wheel-facing face, the second face being generally perpendicular to the belt-engaging face.

11. A cross-link as claimed in claim 1, the elongate member having a first end and a second end, the bottom portion comprising an inner surface extending from the first end to the second end, the inner surface being generally flat.

12. A cross-link as claimed in claim 1, comprising a sole mountable in the channel for engaging the ground surface.

13. A cross-link as claimed in claim 12, the sole comprising:
a base portion for mounting in the channel; and
a ground-engaging portion for engaging the ground surface, the ground-engaging portion comprising polymeric material that contacts the ground surface when the tracked vehicle moves.

14. A cross-link as claimed in claim 13, the polymeric material being elastomeric material.

15. A cross-link as claimed in claim 13, the base portion being integral with the ground-engaging portion and comprising polymeric material integral with the polymeric material of the ground-engaging portion.

16. A cross-link as claimed in claim 13, the base portion comprising a pair of sidewall-engaging surfaces for engaging the sidewalls when the sole is mounted in the channel, the sidewall-engaging surfaces being generally parallel to one another.

17. A cross-link as claimed in claim 12, the sole comprising a plurality of fasteners to mount the sole to the elongate member.

18. A cross-link as claimed in claim 17, the sole comprising polymeric material and a frame member within the polymeric material, the frame member supporting the fasteners.

19. A cross-link as claimed in claim 12, the sole comprising:
an inner side for facing the elongate member;
an outer side opposite the inner side for engaging the ground surface; and
a plurality of blind holes for receiving fasteners to mount the sole to the elongate member, the blind holes extending from the inner side without reaching the outer side.

20. A cross-link as claimed in claim 19, the fasteners being integrated with the sole.

21. A cross-link as claimed in claim 12, the sidewalls having terminating edges, the sole overlying the terminating edges when the sole is mounted to the elongate member.

22. A cross-link as claimed in claim 13, the ground-engaging portion being wider than the base portion.

23. A cross-link as claimed in claim 1, the wheel guide being connected to the elongate member by being fastened to the elongate member by a plurality of fasteners extending from the wheel guide to the elongate member.

24. A cross-link as claimed in claim 1, the wheel guide being connected to the elongate member by being integrally formed with the elongate member.

25. A cross-link as claimed in claim 1, wherein each of the sidewalls varies in height along the elongate member.

26. A cross-link as claimed in claim 1, wherein each of the sidewalls tapers towards a longitudinal end of the elongate member.

27. A cross-link as claimed in claim 26, wherein the longitudinal end of the elongate member is a first longitudinal end of the elongate member and each of the sidewalls tapers towards a second longitudinal end of the elongate member.

28. A cross-link for a track of a tracked vehicle, the track comprising belts spaced apart to accommodate a plurality of wheels of the tracked vehicle, the belts having a ground-facing side for facing a ground surface on which the tracked vehicle travels, the cross-link comprising:
an elongate member for mounting to the belts to interconnect the belts, the elongate member having a belt-engaging face contacting the belts on the ground-facing side when the elongate member is mounted to the belts, the elongate member defining a channel, the channel comprising a bottom portion, a pair of sidewalls extending from the bottom portion, and a top which is open between the sidewalls, the top of the channel being located below the bottom portion of the channel when the cross-link engages the ground surface; and
a wheel guide comprising a pair of guide projections spaced apart from one another, the wheel guide and the elongate member being connected to one another and constituting a one-piece component that is mountable to the belts as a unit, the guide projections projecting away from the belt-engaging face and opposite the ground-facing side, the wheel guide being capable of engaging the wheels of the tracked vehicle as the tracked vehicle travels over the track such that, when the wheel guide engages a given one of the wheels, the given one of the wheels is received between the guide projections.

29. A cross-link for a track of a tracked vehicle, the track comprising belts spaced apart to accommodate a plurality of wheels of the tracked vehicle, the belts having a ground-facing side for facing a ground surface on which the tracked vehicle travels, the cross-link comprising:
an elongate member for mounting to the belts to interconnect the belts, the elongate member having a belt-engaging face contacting the belts on the ground-facing side when the elongate member is mounted to the belts, the elongate member defining a channel, the channel comprising a bottom portion, a pair of sidewalls extending from the bottom portion, and a top which is open between the sidewalls, the top of the channel being located below the bottom portion of the channel when the cross-link engages the ground surface, each of the sidewalls varying in height along the elongate member; and a wheel guide comprising a pair of guide projections spaced apart from one another, the wheel guide being connected to the elongate member, the guide projections projecting away from the belt-engaging face and opposite the ground-facing side, the wheel guide being capable of engaging the wheels of the tracked vehicle as the tracked vehicle travels over the track such that, when the wheel guide engages a given one of the wheels, the given one of the wheels is received between the guide projections.

30. A cross-link as claimed in claim 29, wherein each of the sidewalls tapers towards a longitudinal end of the elongate member.

31. A cross-link as claimed in claim 30, wherein the longitudinal end of the elongate member is a first longitudinal end of the elongate member and each of the sidewalls tapers towards a second longitudinal end of the elongate member.

32. A cross-link as claimed in claim 28, each of the guide projections comprising a wheel-facing face for facing the given one of the wheels received between the guide projections, the wheel-facing face defining an obtuse angle with the belt-engaging face.

33. A cross-link as claimed in claim 28, the elongate member having a first end and a second end, the channel having a substantially constant width between the sidewalls from the first end to the second end.

34. A cross-link as claimed in claim 28, each of the sidewalls having a height and a thickness, the height being measured relative to the belt-engaging face, each of the sidewalls having a height-to-thickness ratio of at least 3.0.

35. A cross-link as claimed in claim 28, the wheel guide being connected to the elongate member by being welded to the elongate member.

36. A cross-link as claimed in claim 28, comprising a sole mountable in the channel for engaging the ground surface.

37. A cross-link as claimed in claim 36, the sole comprising:
   a base portion for mounting in the channel; and
   a ground-engaging portion for engaging the ground surface, the ground-engaging portion comprising polymeric material that contacts the ground surface when the tracked vehicle moves.

38. A cross-link as claimed in claim 37, the base portion being integral with the ground-engaging portion and comprising polymeric material integral with the polymeric material of the ground-engaging portion.

39. A cross-link as claimed in claim 36, the sole comprising a plurality of fasteners to mount the sole to the elongate member.

40. A cross-link as claimed in claim 39, the sole comprising polymeric material and a frame member within the polymeric material, the frame member supporting the fasteners.

41. A cross-link as claimed in claim 28, the wheel guide being connected to the elongate member by being fastened to the elongate member by a plurality of fasteners extending from the wheel guide to the elongate member.

42. A cross-link as claimed in claim 37, the ground-engaging portion being wider than the base portion.

43. A cross-link as claimed in claim 36, the sidewalls having terminating edges, the sole overlying the terminating edges when the sole is mounted to the elongate member.

44. A cross-link as claimed in claim 28, the wheel guide being connected to the elongate member by being integrally formed with the elongate member.

45. A cross-link as claimed in claim 28, wherein each of the sidewalls varies in height along the elongate member.

46. A cross-link as claimed in claim 28, wherein each of the sidewalls tapers towards a longitudinal end of the elongate member.

47. A cross-link as claimed in claim 46, wherein the longitudinal end of the elongate member is a first longitudinal end of the elongate member and each of the sidewalls tapers towards a second longitudinal end of the elongate member.

48. A cross-link as claimed in claim 29, the wheel guide being connected to the elongate member by being welded to the elongate member.

49. A cross-link as claimed in claim 29, each of the guide projections comprising a wheel-facing face for facing the given one of the wheels received between the guide projections, the wheel-facing face defining an obtuse angle with the belt-engaging face.

50. A cross-link as claimed in claim 29, the elongate member having a first end and a second end, the channel having a substantially constant width between the sidewalls from the first end to the second end.

51. A cross-link as claimed in claim 29, the wheel guide being connected to the elongate member by being fastened to the elongate member by a plurality of fasteners extending from the wheel guide to the elongate member.

52. A cross-link as claimed in claim 29, comprising a sole mountable in the channel for engaging the ground surface.

53. A cross-link as claimed in claim 52, the sole comprising:
   a base portion for mounting in the channel; and
   a ground-engaging portion for engaging the ground surface, the ground-engaging portion comprising polymeric material that contacts the ground surface when the tracked vehicle moves.

54. A cross-link as claimed in claim 53, the base portion being integral with the ground-engaging portion and comprising polymeric material integral with the polymeric material of the ground-engaging portion.

55. A cross-link as claimed in claim 52, the sole comprising a plurality of fasteners to mount the sole to the elongate member.

56. A cross-link as claimed in claim 55, the sole comprising polymeric material and a frame member within the polymeric material, the frame member supporting the fasteners.

57. A cross-link as claimed in claim 53, the ground-engaging portion being wider than the base portion.

58. A cross-link as claimed in claim 29, the wheel guide being connected to the elongate member by being integrally formed with the elongate member.

59. A cross-link as claimed in claim 52, the sidewalls having terminating edges, the sole overlying the terminating edges when the sole is mounted to the elongate member.

\* \* \* \* \*